United States Patent

Childers et al.

[15] 3,677,001
[45] July 18, 1972

[54] SUBMERGED HYDRAULIC SYSTEM

[72] Inventors: Thomas W. Childers, Woodland Hills; Joseph A. Burkhardt, Chatsworth; Roger J. Koerner, Santa Monica, all of Calif.

[73] Assignee: Esso Production Research Company

[22] Filed: May 4, 1970

[21] Appl. No.: 46,585

Related U.S. Application Data

[62] Division of Ser. No. 787,151, Dec. 26, 1968, abandoned.

[52] U.S. Cl ............................................. 60/51, 60/52 CD
[51] Int. Cl .......................................................... F15b 1/02
[58] Field of Search .................... 60/51, 52 CD, DIG. 2, 52 T, 60/52 US; 91/459; 92/130

[56] References Cited

UNITED STATES PATENTS

| 2,291,243 | 7/1942 | Levy | 92/162 |
| 2,399,294 | 4/1946 | Ray | 60/52 T |
| 3,454,169 | 7/1969 | Bridges | 60/51 UX |

FOREIGN PATENTS OR APPLICATIONS

| 463,568 | 4/1937 | Great Britain | 60/52 US |

Primary Examiner—Edgar W. Geoghegan
Attorney—Melvin F. Fincke

[57] ABSTRACT

A static seal for a power fluid operated actuator is arranged in a cylinder to close off the space between a piston and a cylinder in which the piston reciprocates at the end of the power stroke of the piston. The piston has a fixed stroke and may be used to actuate apparatus requiring definite movements, such as valves and flow diverters. The piston may be single or double acting. For remote underwater operations, the actuator is connected into a closed hydraulic system which also includes a hydraulic reservoir, an electrically powered pump and a hydraulic accumulator to furnish hydraulic power fluid to the cylinder. Electrically operated valves are used to direct the flow of power fluid in the proper directions. The piston is spring-loaded to permit the piston to exhaust the cylinder and return the piston to its initial position to operate automatically the apparatus being actuated in the event of power failure.

5 Claims, 1 Drawing Figure

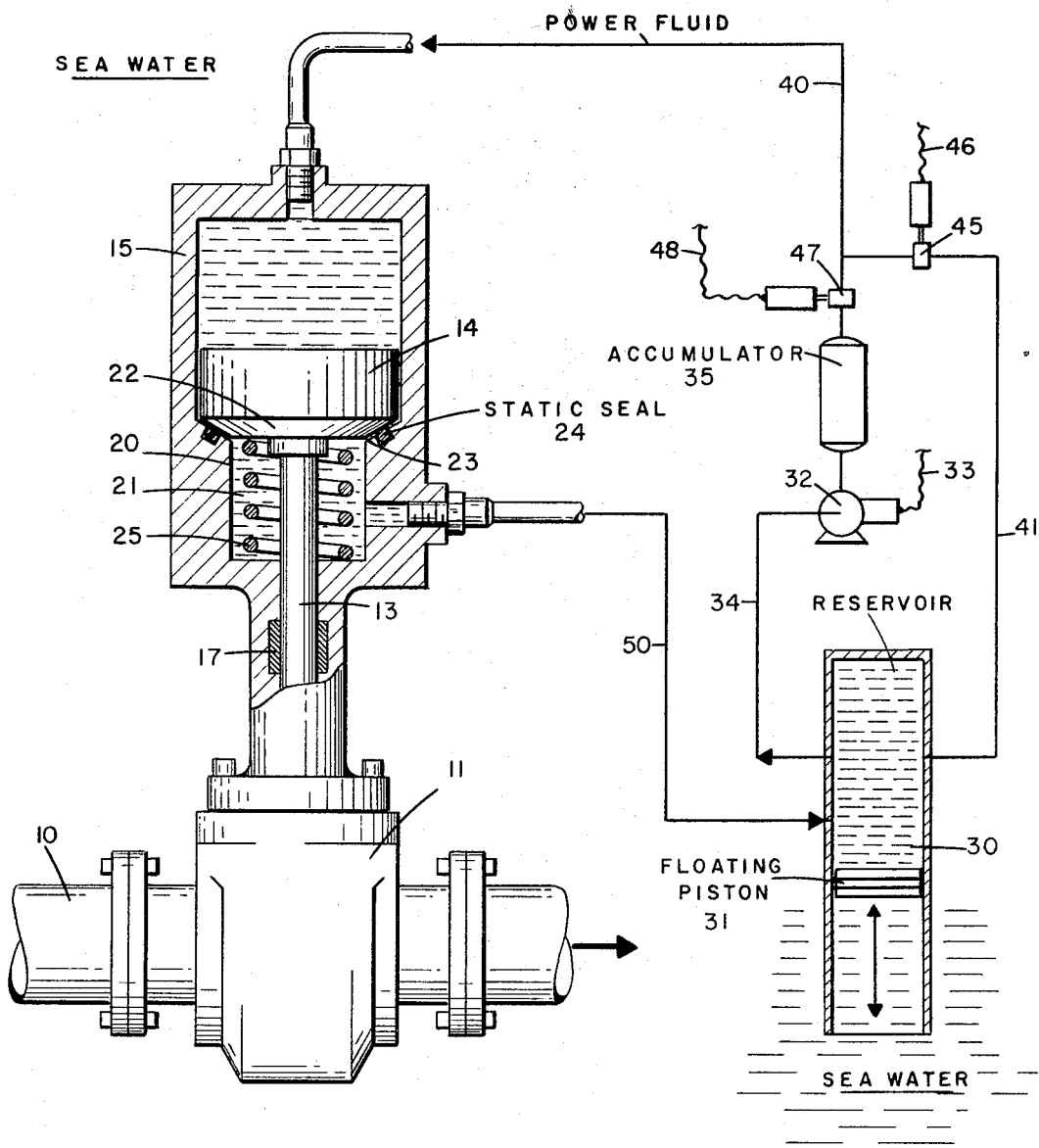

SUBMERGED HYDRAULIC SYSTEM

This is a division of Application Ser. No. 787,151 filed Dec. 26, 1968, now abandoned.

BACKGROUND OF THE INVENTION

FIELD OF THE INVENTION

The present invention generally concerns fluid actuator apparatus. More particularly, the present invention concerns hydraulic actuator apparatus and especially fail-safe, hydraulically actuated valves located on underwater flowlines.

In one manner of operation of remote underwater apparatus, such as valves, a piston actuator reciprocates within a cylinder to actuate the apparatus. In a single acting piston-cylinder system, power fluid forces the piston in one direction (power stroke) and a spring returns the piston to its starting position (exhaust stroke). The chamber or cavity in which the spring is positioned is filled with a liquid and connected to a pressure compensating bellows which breathes as the piston moves. However, the bellows has a limited volume. If power fluid leaks past the piston seal into the spring chamber, either the excess power fluid must be released or else the piston will become fluid locked and fail to operate. Neither the loss of fluid nor fluid locking is acceptable in a self-contained hydraulic actuator system used in submerged oil and gas production systems.

SUMMARY OF THE INVENTION

In accordance with the teachings of the invention, these disadvantages are overcome by connecting the chamber in which the return spring is positioned into a closed hydraulic system instead of to the pressure compensating bellows. The closed hydraulic system includes a hydraulic power fluid reservoir which serves both as a supply of hydraulic fluid and as a common compensating bellows. Leakage of power fluid past the piston is returned to the reservoir. Power fluid volume in the system, therefore, remains constant. A static seal which engages only when the piston has ended its power stroke and, accordingly when the apparatus being actuated is moved to one of its extreme positions, e.g., a fully open position for a valve member, eliminates the need for any dynamic seal on the power piston.

The invention briefly described is a fluid actuator system which comprises a cylinder; a piston having a predetermined stroke arranged in the cylinder; means for introducing power fluid into the cylinder to move the piston during its power stroke; and sealing means arranged between the piston and the cylinder adapted to close off the space therebetween only at the end of the power stroke of the piston. The piston-cylinder arrangement may be double acting, in which case the piston will seal at the end of each power stroke thereof. In the case of the single acting piston, means are provided to return the piston to its initial position during its exhaust stroke. The apparatus to be actuated is connected to the piston and is actuated in response to movement of the piston.

In the operation of underwater equipment, such as valve or flow diverter apparatus, the hydraulic power fluid reservoir is connected by means of one conduit to the spring chamber and by means of another conduit to the cylinder. This other conduit is also connected to an accumulator and a pump arranged in series. A third bypass conduit connects this other conduit to the power fluid reservoir for the purpose of bypassing the accumulator and pump upon return of power fluid from the cylinder to the power fluid reservoir. Suitable valving is provided in these conduits for that purpose. Preferably, the static seal is made between a shoulder formed on the periphery of the piston and an internal seating shoulder formed in the cylinder. An "O"-ring or other type of seal may be located on the piston shoulder or on an internal seating shoulder of the cylinder or the seal may be a ring member not attached or fixed to either the cylinder or the piston.

The advantages of the improved actuator system include the following: (1) The static seal is less subject to failure than a dynamic seal. (2) Slight leakage past the power piston is tolerated. (3) There are no dead spaces in which hydraulic fluid contaminants may accumulate and cause corrosion. (4) The system is purged by leakage of a small amount of hydraulic fluid past the power piston during each power stroke of the piston. (5) Impurities in the hydraulic fluid settle out in the reservoir. (6) The cost of the actuator is substantially reduced because machine tolerances are considerably relaxed.

BRIEF DESCRIPTION OF THE DRAWINGS

The above objects and advantages of the invention will be apparent from a more detailed description thereof when taken with the drawings wherein:

The sole FIGURE shows a static seal-hydraulic power fluid actuator system in accordance with the invention.

DESCRIPTION OF THE PREFERRED EMBODIMENTS

There is shown in the figure a submerged pipeline 10 on which is arranged a valve housing 11 which contains a valve member, not shown, adapted to open and close pipeline 10 to control the flow of fluid therethrough. A valve stem housing is mounted on valve housing 11. A valve stem 13 extends through the valve stem housing and connects to a piston 14 arranged in an actuator cylinder 15. Piston 14 has fixed power and exhaust strokes. The valve stem housing is provided with packing seals 17 which surround and seal off fluid flow around valve stem 13.

A reduced internal diameter portion 20 of actuator cylinder 15 forms a cavity or chamber 21 and a seating shoulder 23. A mating shoulder 22 formed on piston 14 is adapted to engage shoulder 23. A static seal 24 which suitably may be an "O"-ring is arranged in a recess in shoulder 23 and seals off the space between shoulders 22 and 23 when piston 14 is at the end of its power stroke, as shown in the figure. A spring 25 is arranged in chamber 21 and functions to move piston 14 in its exhaust stroke. When the valve is fully open, piston 14 is at the end of its power stroke and when the valve is fully closed the piston is at the end of its exhaust stroke.

When the valve (or other equipment) to be operated is located at a remote offshore location, a hydraulic power fluid reservoir 30 is provided with a floating piston 31, compensated by sea water pressure. A diaphragm could be substituted for piston 31. A conduit 34 supplies a pump 32 with hydraulic control fluid from reservoir 30. Pump 32 is operated by electrical power supplied from the water's surface through a conductor 33. An accumulator 35 is connected to pump 32 to the exhaust stroke end of actuator cylinder 15 by means of a conduit 40. The purpose of the accumulator is to provide a supply of power fluid available for immediate delivery to cylinder 15. A bypass conduit 41 connects conduit 40 to reservoir 30. A solenoid operated valve 45 controlled by electrical power supplied from the water's surface through a conductor 46 is connected into conduit 41. Another solenoid operated valve 47 supplied with operating power from the water's surface through a conduit 48 is arranged between accumulator 35 and the junction of conduits 40 and 41. An additional conduit 50 connects chamber 21 to reservoir 30.

Preferably, piston 14 is not closely fitted in actuator cylinder 15 so that a small amount of leakage occurs around piston 14 in each cycle of operation.

OPERATION

The valve in valve housing 11 is maintained open until a power failure occurs and then the valve automatically closes to prevent flow of fluid through pipeline 10. Electrical power is applied to the submerged equipment through conductors 33, 46 and 48. Operation of the valves is arranged such that valve 45 is closed upon application of power to it and valve 47 is open upon application of power to it. In these positions of the valves, power fluid from reservoir 30, is pumped through conduit 34, pump 32, accumulator 35, valve 47 and conduit 40 to actuator cylinder 15 to force piston 14 to the end of its power stroke, the position shown in the figure, against the bias of spring 25. In that position, shoulder 22 on piston 14 seats on internal shoulder 23 of actuator cylinder 15 and contacts seal 24 to close off the space between these shoulders. Movement of piston 14 in its power stroke causes excess hydraulic power fluid which accumulates in chamber 21 to be returned to reservoir 30 through conduit 50.

Upon failure of electrical power, pump 32 shuts down, valve 45 opens and valve 47 closes. Spring 25 moves piston 14 in its exhaust stroke (upwardly as shown in the figure) to cause the valve in valve housing 11 to close. Power fluid in cylinder 15 is forced through conduits 40 and 41 to return to reservoir 30.

Various modifications may be made in the preferred embodiment of the invention which has been described without departing from the spirit and scope thereof. For example, the static seal principle is not limited to use on valves which are pressure compensated by the hydraulic power fluid reservoir; the addition of the static seal to conventional valves with individual compensating bellows would improve the reliability of these valves as the static seal backs up the dynamic piston seal. Further, the pump may be provided with an automatic pressure-sensitive shut-off switch. In addition, while only one valve is shown being operated in this actuator system, one reservoir, pump and accumulator may be used along with suitable piping and valving to control many valves or other apparatus, such as flow diverters, to be operated by the actuator pistons. In addition, although two solenoid operated valves are shown and described for controlling flow of fluid to and from the reservoir, one three-way valve could be used instead.

Having fully described the objects, advantages, apparatus and operation of our invention, we claim:

1. A submerged closed hydraulic system comprising:

a cylinder having a power end and exhaust end;

a piston having a predetermined stroke arranged in said cylinder;

means for introducing power fluid into said cylinder to act on one side of said piston to move said piston in its power stroke;

sealing means arranged between said piston and said cylinder for sealing off flow of fluids from said power end to said exhaust end of said cylinder only at the end of the power stroke of said piston;

means adapted to return said piston to its initial position in an exhaust stroke;

means connected to the other side of said piston adapted to be actuated in response to movement thereof;

said means adapted to return said piston to its initial position comprising a spring member, said spring member being arranged on the other side of said piston;

a power fluid reservoir having pressure and volume compensating means for isolating power fluid in said reservoir from the surrounding fluid environment;

a first conduit fluidly communicating said reservoir and said exhaust end of said cylinder;

a second conduit fluidly communicating said power end of said cylinder and said reservoir;

an accumulator and a pump connected into said second conduit;

a third conduit connecting said second conduit and said reservoir adapted to bypass said accumulator and pump; and means adapted to control flow of power fluid from said reservoir to said cylinder through said second conduit and to control return of power fluid from said cylinder to said reservoir through said second conduit and said third conduit.

2. Apparatus as recited in claim 1 in which said means for controlling flow of fluid includes surface-operated electric valves.

3. A closed hydraulic system submerged in water comprising:

a power fluid reservoir having pressure and volume compensating means for isolating power fluid in said reservoir from the surrounding water;

a hydraulic pump for pumping said power fluid;

a high pressure accumulator for said power fluid;

a power fluid operable means having a power end and an exhaust end capable of operating subsea equipment;

first power fluid conduits connecting said pump to said accumulator and said accumulator to the power end of said power fluid operable means; and second power fluid conduits connecting the exhaust end of said power fluid operable means to said reservoir and said reservoir to said pump.

4. A system as recited in claim 3 including valve means in said first power fluid conduit for permitting and preventing flow of power fluid from said accumulator to said power fluid operable means; and means for remotely operating said valve means and said pump.

5. A system as recited in claim 4 including third power fluid conduits connecting said reservoir to said first power fluid conduit downstream of said accumulator and valve means; and another remotely operable valve means arranged in said third power fluid conduit.

* * * * *